US012440952B2

(12) United States Patent
Hahn et al.

(10) Patent No.: US 12,440,952 B2
(45) Date of Patent: Oct. 14, 2025

(54) HAMMER DRILL AND METHOD FOR DEEP DRILLING

(71) Applicant: Fraunhofer-Gesellschaft zur Förderung der angewandten Forschung e.V., Munich (DE)

(72) Inventors: Simon Hahn, Bochum (DE); Philipp Schroer, genannt Fleutert, Bochum (DE); Volker Wittig, Bochum (DE); Marian Bunk, Bochum (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/680,598

(22) Filed: May 31, 2024

(65) Prior Publication Data

US 2024/0335931 A1 Oct. 10, 2024

Related U.S. Application Data

(63) Continuation of application No. PCT/EP2022/084384, filed on Dec. 5, 2022.

(30) Foreign Application Priority Data

Dec. 7, 2021 (DE) ..................... 10 2021 213 908.6

(51) Int. Cl.
*B25D 9/12* (2006.01)
*B25D 17/06* (2006.01)

(52) U.S. Cl.
CPC ............... *B25D 9/12* (2013.01); *B25D 17/06* (2013.01)

(58) Field of Classification Search
CPC .. B25D 9/12; B25D 17/06; B25D 2217/0019; B25D 2250/371; B25D 9/08; B25D 9/14;
(Continued)

(56) References Cited

U.S. PATENT DOCUMENTS 271,781 A 2/1883 Brazelle
3,780,621 A 12/1973 Romell
(Continued)

FOREIGN PATENT DOCUMENTS

EP 2902154 A1 * 8/2015 ............... B25D 9/08
GB 2035183 A 6/1980
WO 9201138 A1 1/1992

OTHER PUBLICATIONS

D. Wang, et al., "Hard Rock Deep Well Core Drilling Techniques", dated 2015, pp. 1-75, The China Continental Scientific Drilling Project, Springer Geology, DOI 10.1007/978-3-662-46557-8_5 Science Press, Beijing and Springer-Verlag Berlin Heidelberg.
(Continued)

*Primary Examiner* — Veronica Martin
(74) *Attorney, Agent, or Firm* — Hussey IP, LLC

(57) ABSTRACT

A hammer drill is provided including at least one cylinder, in which at least one piston is mounted such that it can be moved axially between an upper and a lower end position, wherein the cylinder has at least one lower fluid supply, which can be cyclically supplied with a drive fluid, wherein the cylinder is closed with an upper cover and a lower cover, wherein, in the lower end position, the piston is in contact with an inner side of the lower cover and a ring gap is formed between the entire casing surface of the piston and the inner wall of the cylinder. A method for deep drilling using a hammer drill of this type is also provided.

18 Claims, 2 Drawing Sheets

(58) Field of Classification Search
CPC .................. B25D 11/064; B25D 11/12; B25D 2217/0023; B25D 2250/231; B25D 9/04; B25D 9/20; B25D 9/145
See application file for complete search history.

(56) References Cited

U.S. PATENT DOCUMENTS

| | | | | |
|---|---|---|---|---|
| 4,840,517 | A | 6/1989 | Bullivant | |
| 4,974,494 | A | 12/1990 | Kroger | |
| 5,396,965 | A | 3/1995 | Hall et al. | |
| 5,488,998 | A | 2/1996 | Ekwall et al. | |
| 7,434,623 | B2 | 10/2008 | Von et al. | |
| 7,712,552 | B2 | 5/2010 | In et al. | |
| 7,735,584 | B2 | 6/2010 | Purcell | |
| 2007/0261869 | A1* | 11/2007 | In ............................. | E21B 4/14 173/13 |
| 2013/0186667 | A1* | 7/2013 | Pettersson ............. | B25D 9/145 173/171 |

OTHER PUBLICATIONS

He, Jiang-fu, et al., "Design and feasibility analysis of a fluidic jet oscillator with application to horizontal directional well drilling", dated Nov. 9, 2015, pp. 1723-173, Elsevier, Journal of Natural Gas Science and Engineering, 27.
He, Jiang-fu, et al., "Theoretical analysis and design of hydro-hammer with a jet actuator: An engineering application to improve the penetration rate of directional well drilling in hard rock formations", dated May 16, 2018, pp. 1-25, PLOS ONE, 13(5): e0196234.
He, Jiangfu, et. al., "Application of a Fluidic Actuator to Horizontal Directional Well Drilling", dated 2015, pp. 60-63, Atlantis Press, Asia-Pacific Energy Equipment Engineering Research Conference.
He, Jiang-fu, et. al., "Study of drilling muds on the anti-erosion property of a fluidic amplifier in directional drilling", dated 2015, pp. 564-573, Frattura ed Integrità Strutturale (Fracture and Structural Integrity), 34, DOI: 10.3221/IGF-ESIS.34.6.
Jiawang, Chen, et. al., "Numerical Simulation of the Performance of the SC-89 Jet Impact System", dated Oct. 12, 2009, pp. 1-8, Proceedings of the ASME 2009 Dynamic Systems and Control Conference, Hollywood, CA.
Liu, H., "Fracture failure analysis of baseplates in a fluidic amplifier made of WC-11Co cemented carbide", dated 2014, pp. 53-65, Frattura ed Integrità Strutturale (Fracture and Structural Integrity), 27. DOI: 10.3221/IGF-ESIS.27.07.
Peng, Jian-Ming, et al., "Effect of geometric parameters of the bistable fluidic amplifier in the liquid-jet hammer on its threshold flow velocity", dated May 14, 2013, pp. 38-49, Elsevier, Computers & Fluids, 82.
Peng, Jianming, et al., "Fluidic DTH hammer with backward-impact-damping design for hard rock drilling", dated Aug. 17, 2018, pp. 1077-1083, Elsevier, Journal of Petroleum Science and Engineering, vol. 171.
Peng, Jian-Ming, et. al., "The effect of actuator parameters on the critical flow velocity of a fluidic amplifier", dated Mar. 15, 2013, pp. 7741-7751, Applied Mathematical Modelling 37, Elsevier.
Schroer, Philipp, "Design development of the fluidic oscillator", dated Jan. 22, 2020, pp. 1-19, GZB International Geothermal Centre, Fraunhofer IEG.
Teodoriu, Catalin, "Use of Downhole Mud-Driven Hammer for Geothermal Applicationsc.", dated Jan. 30-Feb. 1, 2011, pp. 1-5, Proceedings, Thirty-Seventh Workshop on Geothermal Reservoir Engineering, Stanford, California.
Vieira, Paco, et. al., "Hammer Drilling Technology—The Proved Solution to Drill Hard Rock Formations in the Middle East", dated Sep. 25, 2011, pp. 1-8, Society of Petroleum Engineers International, Bahrain.
Wittig, Volker, et. al., "Hydraulic DTH Fluid / Mud Hammers with Recirculation Capabilities to Improve ROP and Hole Cleaning for Deep, Hard Rock Geothermal Drilling", dated Apr. 19, 2015, pp. 1-9, International Geothermal Centre, Proceedings World Geothermal Congress, Melbourne, Australia.
Wu, Dongyu, et al., "A dynamic mesh-based approach to analyse hydrodynamic interactions between a fluidic hammer and drill bit", dated Dec. 30, 2019, pp. 536-546, Elsevier, Journal of Petroleum Science and Engineering, vol. 175.
Xueqin, Huang, et. al., "Impact performance optimization of a YDC valve-type double action hydraulic hammer", dated Sep. 19, 2018, pp. 425-433, Science Direct, Natural Gas Industry B 5.
Zhang , Xinxin, et. al., "Performance Analysis of a Fluidic Axial Oscillation Tool for Friction Reduction with the Absence of a Throttling Plate", dated Apr. 5, 2017, pp. 1-12, Applied Sciences, 7, 360; doi:10.3390/app7040360.
Zhang, Xinxin, et al., "A high-energy liquid-jet hammer with specially designed backward stroke end buffer structure", dated Nov. 4, 2016, pp. 4935-4948, Journal of Vibroengineering, vol. 18, No. 8.
Zhang, Xinxin, et al., manuscript titled "A fluidic oscillator with concave attachment walls and shorter splitter distance for fluidic DTH hammers", dated Dec. 18, 2017, pp. 1-38, Elsevier, Sensors and Actuators A.
Zhang, Xinxin, et. al., "Experimental study and analysis on a fluidic hammer—an innovative rotary percussion drilling tool", dated Oct. 7, 2018, pp. 362-370, Journal of Petroleum Science and Engineering 173, Elsevier.
Zhang, Xinxin, et. al., "Performance Study of a Fluidic Hammer Controlled by an Output-Fed Bistable Fluidic Oscillator", dated Oct. 13, 2016, pp. 1-15, Applied Sciences, 6, 305; doi:10.3390/app6100305.
Zhang, Xinxin, et. al., "The effect of actuator parameters on the performance of a liquid-jet hammer associated with its jet behavior", dated Nov. 30, 2016, pp. 2610-2620, Institution of Mechanical Engineers, Journal of Mechanical Engineering Science vol. 231 (14).

* cited by examiner

HAMMER DRILL AND METHOD FOR DEEP DRILLING

CROSS-REFERENCE TO RELATED APPLICATIONS

This application is a continuation of PCT/EP2022/084384 filed Dec. 5, 2022, which claims priority under 35 USC § 119 to German patent application DE 10 2021 213 908.6 filed Dec. 7, 2021. The entire contents of each of the above-identified applications are hereby incorporated by reference.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
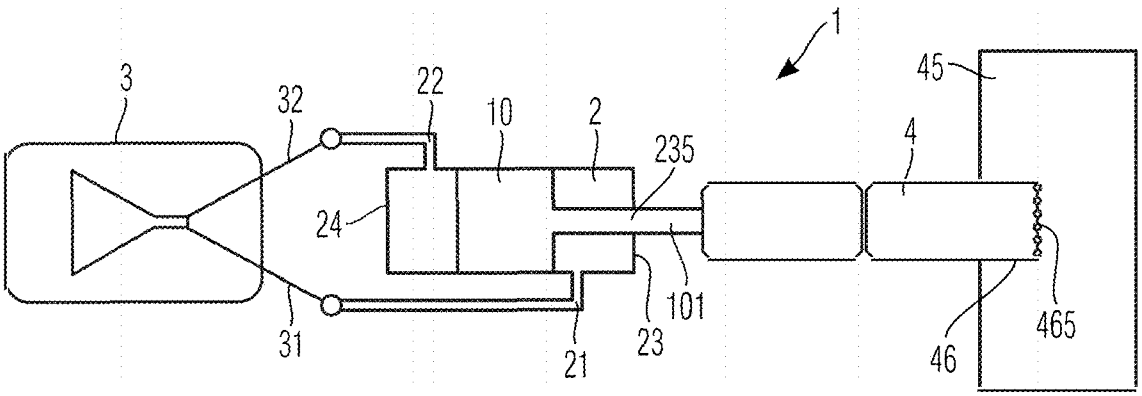
Fig. 1 (Prior Art)
FIG. 1 shows a known hammer drill.

The invention relates to a hammer drill comprising at least one cylinder in which at least one piston is mounted such that it can be moved axially between an upper and a lower end position, the cylinder having at least one lower fluid supply which can be cyclically supplied with a drive fluid. The invention also relates to a method for deep drilling using a hammer drill having at least one cylinder in which at least one piston is mounted such that it can be moved axially between an upper and a lower end position, the cylinder having at least one lower fluid supply which is cyclically supplied with a drive fluid. Devices and methods of this type are used for deep drilling, for example to drill hard rock layers economically. Deep drillings of this type can be used, for example, in oil or gas extraction, in geothermal energy or as an exploratory drilling in mining.

J.-M. Peng, Q.-L. Yin, G.-L. Li, H. Liu and W. Wang: "The effect of actuator parameters on the critical flow velocity of a fluidic amplifier", Applied Mathematical Modelling 37 (2013) 7741 discloses a hammer drill, in which a piston slides in a cylinder. The piston movement is transmitted to the drilling tool via a connecting rod or a push rod. The piston is driven by a drive fluid, for example the flushing fluid used to remove the drill cuttings. The drive fluid is introduced into the cylinder alternately from below and above so that a corresponding piston movement is induced.

This known hammer drill has the disadvantage that the seals between piston and cylinder, on the one hand, and between connecting rod and cylinder base, on the other hand, are heavily loaded and therefore only have a short service life, in particular when an abrasive flushing fluid which is mixed with particles is used as the drive fluid. Due to the restricted service life, the use of the known hammer drill is limited to a few special cases and/or some drilling portions of a deep drilling. Although the known hammer drill renders possible high drilling progress in hard rock layers, it thus requires frequent tool changes in the case of major drilling operations since the tool life is limited.

A drilling tool is provided which has a longer service life and/or an improved performance.

According to one aspect of the invention, a hammer drill is proposed, which has at least one cylinder. The cylinder is formed in a housing which can be made of a metal or an alloy, for example. In the cylinder wall, fluid channels can optionally be formed, for example to transport a drive fluid to the underside of the piston or cylinder that faces the drilling tool and/or to transport flushing fluid to the drilling tool. In some embodiments of the invention, the housing can be made in modular fashion from a plurality of individual parts that are joined together. The cross-section of the housing can be polygonal or round. As a rule, the housing and the cylinder formed in the housing has a greater length than the diameter thereof. The outer diameter of the housing can be between about 5 cm and about 40 cm. The housing can be produced by machining or by primary molding.

At least one piston can be accommodated inside the cylinder and is mounted such that it can be moved axially between an upper and a lower end position. The piston can also be manufactured from a metal or an alloy. In some embodiments of the invention, the piston can have on its front side stop elements made of a softer material, for example a ductile metal or a polymer or an elastomer. In other embodiments of the invention, the piston can be provided with a hard coating on its front side in order to prevent premature wear. The casing surface of a cylindrical piston can be provided with a wear protection layer and/or a friction-reducing coating which can reduce the wear of the piston. In the same way, the inside of the cylinder can be provided with an optional friction-reducing and/or wear-reducing coating. A coating of this type can be selected from TIN or hard chrome or CrN or an oxide or diamond-like carbon (DLC).

The cylinder has at least one lower fluid supply, which can be cyclically supplied with a drive fluid. When the hammer drill is operated, the drive fluid is supplied with a pressure which is sufficient to lift off the piston inside the cylinder against the force of gravity so that it falls back down under its own weight. It is thus possible to produce an impact energy which can be transferred to a drilling tool and leads to the crushing of the rock lying in the drill channel.

In some embodiments of the invention, it is proposed to close the cylinder with an upper cover and a lower cover, the piston in the lower end position resting on or dynamically impacting the inside of the lower cover. In some embodiments of the invention, the lower cover is closed and, in particular, does not have a passage for a connecting rod or a push rod. The impact energy is thus transmitted exclusively from the piston to the drilling tool via the lower cover. This eliminates the need for a wear-prone seal for the passage through the lower cover so that the tool life of the hammer drill can be extended, in particular if the drive is carried out by means of a particle-containing drive fluid, which can also be used as a flushing fluid, for example. In addition, the pressure of the drive fluid can act on the piston over a larger area so that the efficiency of the hammer drill can be increased.

In some embodiments of the invention, the hammer drill can additionally contain an upper fluid supply which allows to actively move the piston downwards by supplying it with a drive fluid so that the impact energy and thus the drilling progress can be increased. In some embodiments of the invention, the drive fluid can be conveyed through the upper fluid supply into the cylinder at a higher pressure than through the lower fluid supply. This allows the piston to be lifted in a material-compatible way in preparation for the impact and a powerful downward movement with high impact energy. Furthermore, the piston can also exert an impact energy on the drilling tool when the drilling is horizontal and the piston does not fall down due to gravity.

In some embodiments of the invention, the lower fluid supply can be designed as a first channel which is passed through the upper cover and the cylinder wall and the lower cover. This results in a compact design of the hammer drill. Due to the integration of the fluid supply inside the housing, damage to external lines is avoided. Due to the modular design, wear parts of the hammer drill can be replaced quickly and inexpensively, also on site.

In some embodiments of the invention, the upper fluid supply can be designed as a second channel, which is passed through the upper cover. The integration of the fluid supply within the housing avoids damage to external lines.

In some embodiments of the invention, the hammer drill also contains a flushing channel through which the drive fluid can be removed from the cylinder. The drive fluid can then be passed via the flushing channel to the drilling tool so that the resulting drill cuttings can be discharged by the flushing fluid. In some embodiments of the invention, the drive fluid can contain particles which increase the abrasive wear of the rock to be drilled and thereby accelerate the drilling progress. The particles can have a diameter of less than about 200 μm or less than about 100 μm or less than about 80 μm or less than about 50 μm.

In some embodiments of the invention, an outside of the lower cover can be in contact with a drilling tool. Since connecting rods or push rods are dispensed with, the impact energy, which is generated when the piston strikes the inside of the lower cover, is transmitted directly to the drilling tool via the outside of the lower cover. This results in a compact and mechanically simple design of the hammer drill.

In some embodiments of the invention, a ring gap can be formed between the casing surface of the piston and the inner wall of the cylinder. The ring gap can have a length which corresponds to the length of the piston, i.e. the ring gap extends over the entire casing surface of the piston. The ring gap has a height H, which corresponds to the difference between the inner radius of the cylinder and the outer radius of the piston. The height H of the ring gap can be large enough for particles within the drive fluid to pass through the ring gap. Since a film of fluid can therefore be formed between piston and cylinder, effective lubrication of the piston/cylinder pairing is achieved, which reduces the wear of the hammer drill and ensures a long service life. In addition, the production of the hammer drill can be simplified because a tight tolerance fit of the piston/cylinder pairing is avoided.

In some embodiments of the invention, a ring gap can be formed between the casing surface of the piston and the inner wall of the cylinder, which gap has a gap height H that is greater than $$H = 2 \cdot (R_{a,cylinder} + R_{a,piston}) + 3 \cdot D_{particle},$$

where $R_{a,cylinder}$ and $R_{a,piston}$ are the center roughness values of the casing surface of the piston and the inner wall of the cylinder and $D_{particle}$ denotes the maximum particle size in the drive fluid. In some embodiments of the invention, the center roughness value of the casing surface of the piston and the inner wall of the cylinder can be between about 3 μm and about 25 μm in each case. In some embodiments of the invention, the maximum particle size in the drive fluid can be between about 50 μm and 200 μm or between about 90 μm and about 110 μm. The gap height of the ring gap, which is the difference between the inner radius of the cylinder and the outer radius of the piston, is thus selected in such a way that the particles of the flushing fluid can pass through the ring gap and/or the liquid film has a sufficient thickness to render possible low-wear sliding of the piston/cylinder pairing.

In some embodiments of the invention, a ring gap can be formed between the casing surface of the piston and the inner wall of the cylinder, which gap has a gap height of about 45 μm to about 1500 μm. In other embodiments of the invention, the gap height can be between about 50 μm and about 500 μm. In yet other embodiments of the invention, the gap height can be between about 500 μm to about 1000 μm. The indicated gap heights can be produced with little manufacturing effort so that the hammer drill according to the invention can be easier to manufacture than known hammer drills and can also be used permanently under harsh operating conditions.

In some embodiments of the invention, the piston can have a length from about 10 cm to about 60 cm or from about 20 cm to about 40 cm or from about 40 cm to about 60 cm. The piston is thus considerably longer than in known hammer drills. The length of the piston increases the flow resistance within the ring gap so that pressure losses are reduced and the piston can be driven by the drive fluid despite the gap height which is increased compared to the prior art.

In some embodiments of the invention, there is no sealing member between the piston and the cylinder wall. This can increase the tool life because a component which is subject to wear can be dispensed with.

In some embodiments of the invention, the pressure loss $dP_{gap}$ of the drive fluid in the ring gap during the operation of the hammer drill can be greater than the quotient of the weight force $F_g$ of the piston and the cross-sectional area A of the piston, i.e.

$$dP_{gap} > F_g/A.$$

The force acting on the piston results from the pressure of the drive fluid and the front face of the piston. At least in the case of the lower fluid supply, this force must be large enough so that it is possible to apply the weight force of the piston to move the piston upwards. Since the drive fluid can flow through the ring gap past the piston, no pressure will build up below the piston that is greater than the pressure loss in the ring gap. According to the Darcy-Weissbach formula, this pressure loss is proportional to the aspect ratio of piston length and gap height, the pipe friction coefficient of the flow, the density of the drive fluid and the square of the flow velocity of the drive fluid.

In some embodiments of the invention, the hammer drill further contains at least one hydraulic pump which is designed to convey the drive fluid into the cylinder. A hydraulic pump can be coupled via a hydraulic changeover switch to the upper and the lower fluid supply of the cylinder so that the drive fluid is supplied alternately above and below the piston and moves the piston accordingly.

The hydraulic pump can be part of the hammer drill and can be lowered into the drill hole together with this hammer drill. In some embodiments of the invention, the hydraulic pump can remain on the surface and be connected to the hammer drill via a pipe or hose line.

In some embodiments of the invention, the hydraulic pump itself can in turn be hydraulically driven by a flushing fluid. This makes it possible to use different fluids for the flushing fluid, on the one hand, and for the drive fluid of the hammer drill, on the other hand. For example, the flushing fluid can be water, which is provided with abrasive particles. The drive fluid of the hammer drill can, for example, be particle-free clear water, an alcohol and/or an oil. In this case, the hydraulic pump can be a centrifugal pump, a gear pump or a piston pump. This pump can be driven by a turbine or an inverse-acting gear pump, through which the flushing fluid flows and which, in this way, generates mechanical drive power for the hydraulic pump of the drive fluid from the flow energy of the flushing fluid, similar to an exhaust gas turbocharger in an internal combustion engine.

In some embodiments of the invention, the hammer drill can also contain a switching element which interrupts the supply of the drive fluid to the cylinder when the hammer drill with its attached drilling tool is not in engagement with a layer of rock. As soon as the hammer drill is axially loaded, the switching element can release the drive fluid so that the hammer drill is switched on. This allows the hammer drill to be lowered in the drill hole while a flushing fluid is supplied thereto.

In some embodiments of the invention, the switching element contains a cylindrical housing with a control piston slidingly mounted therein, the housing having an inlet on the upper side thereof. The housing also contains a first outlet on a side wall, via which the flushing fluid is passed via a flushing channel to the front side of the hammer drill or to the drilling tool. In addition, the switching element contains a second outlet, which is arranged inside the control piston and via which the drive fluid is supplied to the hammer drill. The control piston is mounted in the housing by means of a compression spring so that it unblocks the first outlet. When the switching element is axially loaded, the control piston retracts against the spring force so that the first outlet is closed by the piston. The flushing fluid is then passed through the hammer drill and switches on the impact mechanism.

The invention shall be described in more detail below by means of the drawings without limiting the general concept of the invention.

A known hammer drill 1 is explained in more detail by means if FIG. 1. The hammer drill 1 is designed and intended to drill a deep drill hole in the earth's crust 45. The deep drilling can, for example be a mining or scientific exploratory drilling or a drilling intended for the exploitation of mineral resources such as crude oil or natural gas. In some embodiments of the invention, the deep drilling can be used to recover heat through geothermal energy. The deep drill hole can be approximately vertical or even inclined or horizontal.

In order to produce the deep drill hole 46, a drilling tool 4 is provided which can optionally be equipped with cutting edges on its front side 465. The drilling tool 4 can be set in rotation by means of a drive (not shown). Furthermore, it has proven to be advantageous—in particular when drilling hard rock—to exert impacts in the axial direction on the drilling tool 4 so that the hard rock is crushed and, together with a flushing fluid, can be transported away as drilling dust together with a flushing fluid.

The impact energy is generated by means of a cylinder 2, in which a piston 10 is mounted such that it can be moved axially. The cylinder 2 has a lower fluid supply 21 and an upper fluid supply 22. In addition, the cylinder 2 is closed on the side facing the drilling tool 4 by means of a lower cover 23. On the side opposite to the drilling tool there is an upper cover 24.

In order to generate an impact, a drive fluid is introduced under pressure via the lower fluid supply 21 into the space between the piston and the lower cover 23 so that the piston moves in the direction of the upper cover 24. When the piston has reached the upper turnaround point, the upper fluid supply 22 is supplied with a drive fluid which moves the piston 10 downwards within the cylinder 2. The impact energy generated in this way is transmitted to the drilling tool 4 via a connecting rod 101. For this purpose, the lower cover 23 has a passage 235, in which the connecting rod 101 can be moved axially and is accommodated in a sealing fashion. The length of the piston of the known hammer drill 1 is about 4 cm.

In order to alternately supply a drive fluid to the cylinder 2 through the lower fluid supply 21 and the upper fluid supply 22, a hydraulic changeover switch 3 is available. The drive fluid is supplied to the hydraulic changeover switch via a pump (not shown) at increased pressure so that this fluid is alternately discharged via a first output 31 and a second output 32 of the hydraulic changeover switch 3, which are connected to the lower fluid supply 21 and the upper fluid supply 22, respectively. A drive fluid that is preferably used is a flushing fluid which substantially contains water in which abrasive particles are dispersed. The flushing fluid can be partially conducted past the hydraulic changeover switch 3 via flushing channels (not shown) in order to cool the drilling tool 4 directly in the drill hole 46, remove resulting drilling dust and accelerate the drilling progress due to the abrasive wear caused by the particles. In addition, the flushing fluid can be used completely or partially to drive the hammer drill, as described above. The drive fluid expelled from the cylinder 2 can also be ejected via flushing channels (not shown) in the direction of the drilling tool 4 or be returned directly to the surface.

The known hammer drill shown in FIG. 1 has the disadvantage that a tight tolerance fit must be produced between the piston 10 and the cylinder 2 in order to allow the piston 10 to slide easily in the cylinder 2, on the one hand, and to achieve sufficient tightness between the two components, on the other hand. It is common practice to additionally use sealing members, for example in the form of a metallic seal made of ductile material or an elastomer seal. If a particle-containing flushing fluid is used as the drive fluid, the piston/cylinder pairing manufactured with high precision is quickly destroyed by abrasive wear. The frequent replacement of the hammer drill 1 after a short period of operation makes its use uneconomical for many applications and requires frequent interruptions to the drilling progress, during which the hammer drill has to be brought to the surface for replacement or maintenance.

The same problem arises at the passage 235 in the lower cover 23, where tight tolerance fits and additional sealing members must also be used to ensure that the pressure introduced via the lower fluid supply 21 actually acts on the piston 10 and does not escape from the cylinder 2 through the opening 235. This fit or the sealing member used therein must also be manufactured with high precision and is subject to heavy abrasive wear resulting from the flushing fluid used as the drive fluid. Finally, the hammer drill shown in FIG. 1 has the disadvantage that, due to the double mounting in the cylinder 2 and in the lower cover 23, the piston 10 and the connecting rod 101 tend to jam when the drilling tool is loaded from the side. Also in this case, the work must be interrupted and the hammer drill 1 must be returned to the surface.

Figure 2:
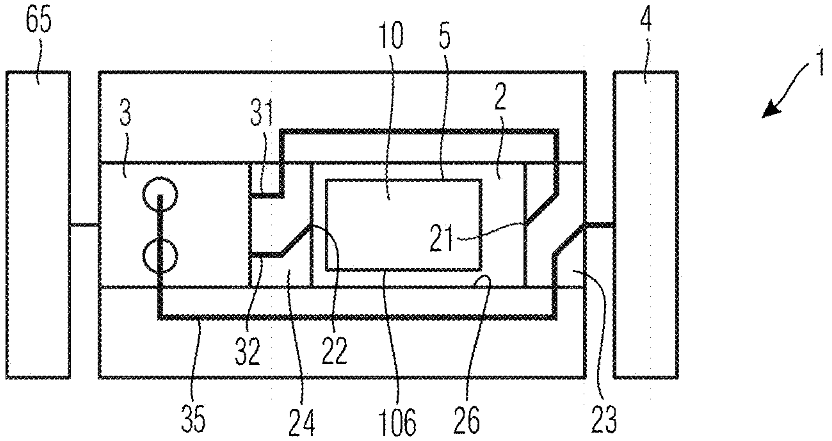
FIG. 2 shows the functional principle of a hammer drill according to the invention.

A hammer drill is provided that can be operated in a more reliable manner so that the drilling progress is accelerated. In addition, the hammer drill 1 should have a higher stability. The solution found in this connection is explained in more detail with reference to FIGS. 2 to 6. FIG. 2 here shows the functional principle. Three embodiments of the invention are described in more detail by means of FIGS. 3 to 6.

FIG. 2 shows the functional principle of the hammer drill 1 according to one aspect of the invention. Identical components of the invention are provided with identical reference signs. The hammer drill 1 according to FIG. 2 also comprises a drilling tool 4, which is designed and intended to crushing and/or chipping the rock and discharging it as drilling dust together with a flushing fluid. The drilling tool 4 can have a diameter of about 5 cm to about 40 cm. Optionally, the drilling tool can be a hollow cylinder or contain a hollow cylinder so that the material of the drill hole 46 can be removed as a drill core.

In addition, the hammer drill 1 contains a cylinder 2 in which a piston 10 is mounted such that it can be moved axially. The cylinder 2 can be formed in a housing which can be made of a metal or an alloy. The housing can be provided on the outside and/or the inside wall 26 of the cylinder 2 by means of a wear- or friction-reducing coating. In some embodiments, the coating can be selected from a hard chrome plating and/or an oxide and/or a nitride and/or a carbide and/or diamond-like carbon (DLC). In a similar manner, the casing surface 106 of the piston 10 can be at least partially coated.

The cylinder 2 is closed on its side facing the drilling tool 4 by means of a lower cover 23. On the side facing away from the drilling tool 4, the cylinder 2 is closed with an upper cover 24. The upper cover 24 is provided with an upper fluid supply 22. In the lower cover 23 there is a lower fluid supply 21.

In contrast to the prior art, no opening 235 is formed in the lower cover 23. Furthermore, the piston 10 also has no connecting rod. There is no direct mechanical connection between the piston 10 and the drilling tool 4. During the operation of the hammer drill 1, the piston periodically strikes the inside of the closed lower cover 23, which transfers the impact energy to the drilling tool.

In addition, the hammer drill can have a hydraulic changeover switch 3. In the schematic diagram in FIG. 1, the hydraulic switch 3 is a component of the cylinder housing. In other embodiments of the invention, the hydraulic changeover switch 3 can also be arranged outside the cylinder housing and can be connected by hose lines to the upper and lower fluid supplies 21 and 22.

The drive fluid is supplied to the cylinder 2 or the hydraulic changeover switch 3 via a high-pressure pump 65.

As in the case of the known hammer drill, the drive fluid is first supplied to the lower fluid supply 21 via the hydraulic changeover switch 3. This ensures that the drive fluid, which is located between the piston 10 and the upper cover 24, is displaced and expelled from the cylinder chamber while the piston 10 moves upwards. When the upper end position is reached, the further supply of drive fluid via the lower fluid supply 21 is interrupted. Then, the drive fluid is supplied via the second outlet 32 of the hydraulic changeover switch 3 to the cylinder 2 via the upper fluid supply 22. As a result, the piston 10 moves downwards. In this connection, the drive fluid is expelled from the lower part of the cylinder 2. In the lower end position, the piston 10 strikes the inside 231 of the lower cover 23. The braking of the piston 10 produces an impact force which is transmitted via the outside 232 of the lower cover 23 to the drilling tool 4. Then, the drive fluid is again supplied via the hydraulic changeover switch 3 and the first outlet 31 thereof to the lower fluid supply 21 and the process is repeated cyclically. The drive fluid ejected from the cylinder 2 during each work cycle can be conveyed via flushing channels 35, which are formed in the housing of the hammer drill 1, to the front side 465 or the engagement surface of the drilling tool 4 in order to cool and/or lubricate the drilling tool 4 in this way and/or remove the resulting drilling dust.

In addition, the hydraulic changeover switch 3 can have an optional third outlet 33. On the one hand, this outlet can be used to conduct the drive fluid discharged from the cylinder 2 into the flushing channel 35. In some embodiments of the invention, however, all or part of the drive fluid can, in a third switching position of the switch 3, also be supplied directly to the third outlet 33 in order to supply the drive fluid as flushing fluid to the drilling tool 4 without the impact mechanism of the rotary hammer 1 being in operation.

A ring gap 5 is formed between the inner wall 26 of the cylinder 2 and the casing surface 106 of the piston 10. The gap height H of this ring gap 5 is defined as the difference between the inner radius of the cylinder 2 and the outer radius of the piston 10. For the gap height H, the following applies in some embodiments of the invention $$H = 2 \cdot (R_{a,cylinder} + R_{a,piston}) + 3 \cdot D_{particle},$$

where $R_{a,cylinder}$ and $R_{a,piston}$ denote the center roughness values of the casing surface 106 of the piston 10 and the inner wall 26 of the cylinder 2. $D_{Particle}$ denotes the maximum particle size in the drive fluid. The center roughness values are typically between about 4 μm and about 25 μm, depending on the manufacturing process of the piston, on the one hand, and the cylinder, on the other hand. The maximum particle size results from the requirements for the flushing fluid but is often less than about 100 μm or less than 80 μm. Accordingly, in some embodiments of the invention, the ring gap has a gap height of about 45 μm to about 1500 μm. In other embodiments of the invention, the gap height is between about 50 μm and about 500 μm. In yet other embodiments of the invention, the gap height is from about 500 μm to about 1000 μm. The ring gap can extend over the entire length of the piston. This means that both a narrow tolerance between piston and cylinder as well as an additional sealing member can be dispensed with when the piston is enlarged compared to known hammer drills and, for example, has a length of about 10 cm to about 60 cm. In these cases, the pressure loss of the drive fluid flowing in the ring gap is so great that the piston can be moved by the drive fluid with sufficient frequency and sufficient speed regardless of the lack of sealing between the casing surface 106 and the inner wall 26, Quite surprisingly it has been shown that, compared to known hammer drills, the hammer drill offers an advantage of around 30% in terms of pressure loss and impact frequency and in this way, together with the extended maintenance intervals, renders possible a significantly faster work progress.

Figure 3:
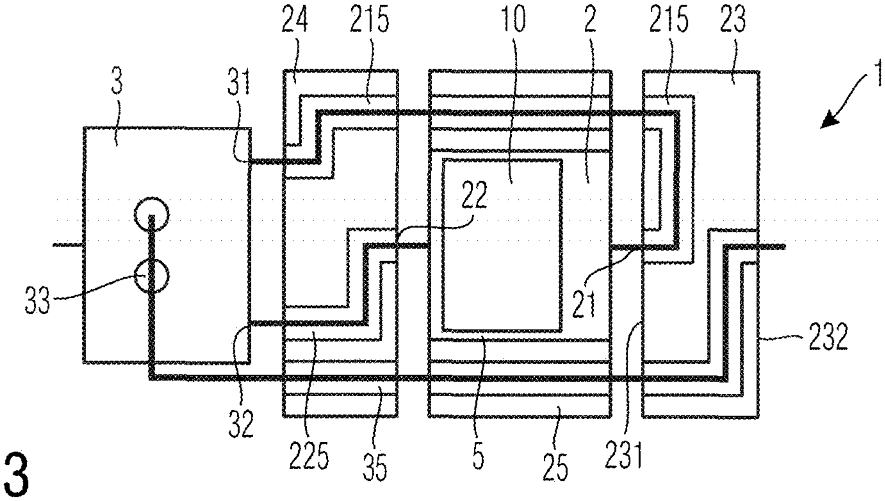
FIG. 3 schematically shows a first embodiment of the structural design of a hammer drill according to the invention.

A first embodiment of the present invention is explained in more detail by means of FIG. 3. Identical components of the invention are provided with identical reference signs so that the following description is limited to the essential differences. As can be seen from FIG. 3, the hydraulic changeover switch 3 is not a part of the cylinder 2 or the housing thereof but is connected as a separate component to the hammer drill 1 by means of pipelines or hose lines. In addition, the housing of the hammer drill 1 is designed in three parts, with an upper cover 24, a lower cover 23 and a cylinder housing located therebetween, in which the cylinder 2 is manufactured as a through-hole. After inserting the piston 10, the housing of the hammer drill 1 can be completed by screwing and/or riveting and/or welding together the upper cover 24, the middle part and the lower cover 23. In the upper cover 24 and in the lower cover 23, first channels 215 and second channels 225 are formed, via which the lower fluid supply 21 and the upper fluid supply 22 are realized. For the flushing channel 35 and the lower fluid supply 21, channels are additionally provided in the cylinder wall 25.

Figure 4:
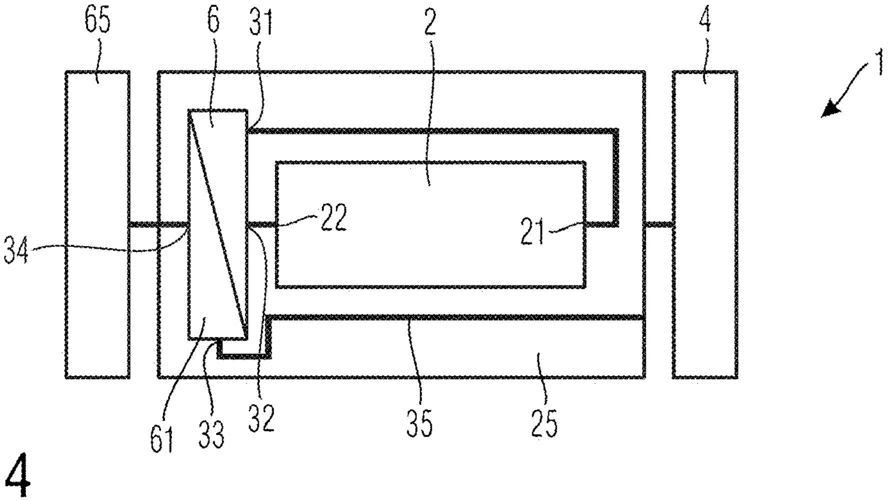
FIG. 4 schematically shows a second embodiment of the structural design of a hammer drill according to the invention.

A second embodiment of the present invention is explained in more detail on the basis of FIG. 4. Identical components of the invention are again marked with the same reference signs. In FIG. 4, the cylinder 2 is only shown schematically. The piston 10, which is also part of the second embodiment, is not shown for reasons of clarity. In addition, the embodiment according to FIG. 4 can also be provided with a multi-part housing as explained above with reference to the first embodiment.

The second embodiment according to FIG. 4 differs from the previous embodiments substantially in that a hydraulic pump 6 is present, with which the drive fluid can be conducted in a closed circuit. This means that when the piston moves upwards, the drive fluid is supplied via the lower fluid supply 21. The drive fluid that is simultaneously pressed out of the upper part of the cylinder 2 is discharged via the upper fluid supply 22 and supplied to a sump or a reservoir. After reaching the upper turnaround point, the drive fluid is removed from the reservoir by means of the hydraulic pump 6 and returned to the cylinder 2 via the upper fluid supply 22. Since the drive fluid circuit is thus self-contained and the drive fluid does not escape into the environment, this fluid can be different from the flushing fluid. For example, water without dispersed particles can be used as the drive fluid. In other embodiments of the invention, the drive fluid can be an alcohol, a water/alcohol mixture or a hydraulic oil. This can reduce the abrasive wear of the piston/cylinder pairing or improve the cooling effect.

The hydraulic pump 6 can, for example, be driven by an electric motor with the supply of electrical energy. In some embodiments of the invention, the hydraulic pump 6 can have a hydraulic drive 61. The hydraulic drive 61 can in turn be driven by the flushing fluid of the drill hole. The flushing fluid is provided by a high-pressure pump 65 for this purpose. It enters the hydraulic drive via a fourth inlet 34 and leaves it via the third outlet 33 and is then used to flush the drill hole or cool the drilling tool 4. The power supplied by the hydraulic drive 61 from the flow of flushing fluid can then be used as mechanical performance to drive the hydraulic pump 6. The hydraulic pump 6 can, for example, be selected from a gear pump or a centrifugal pump or a piston pump. In some embodiments of the invention, the hydraulic drive 61 can contain a turbine or an inverse-acting gear pump.

Figure 5:
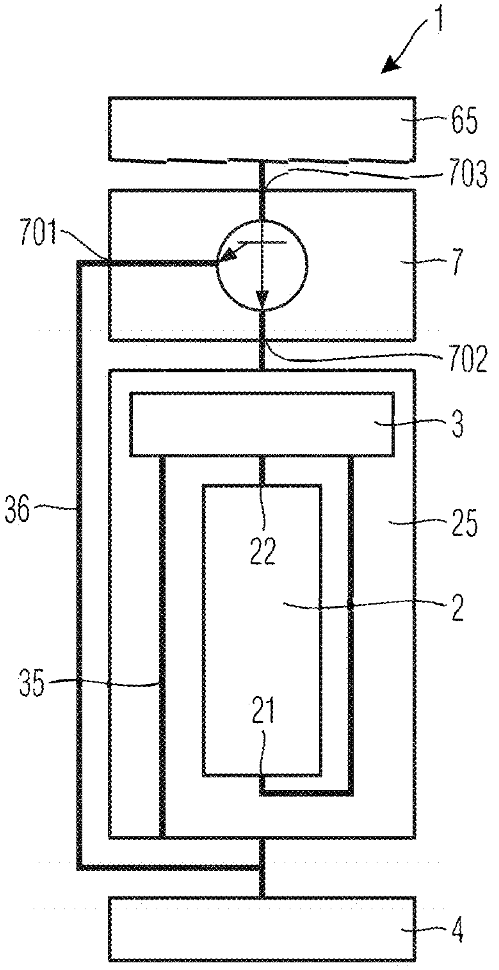
FIG. 5 schematically shows a third embodiment of the structural design of a hammer drill according to the invention.
Figure 6:
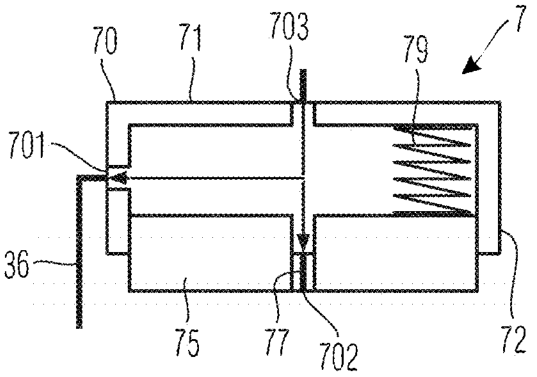
FIG. 6 shows an example embodiment of a switching element.

A third embodiment of the invention is explained in more detail by means of FIGS. 5 and 6. The third embodiment differs substantially by a hydraulic switching element 7. The hydraulic switching element 7 is supplied with the flushing fluid from the high-pressure pump 65 via an inlet 703. Depending on the position of the switching element 7, the flushing fluid is supplied either via the first outlet 701 and/or through the second outlet 702 from the hydraulic switching element 7. The first outlet 701 opens into a second flushing channel 36, which extends past the impact mechanism of the hammer drill 1 and conducts the flushing fluid directly to the drilling tool 4. The second outlet 702 is connected to the impact mechanism of the hammer drill and drives it either directly via the hydraulic changeover switch 3, as described in connection with FIGS. 2 and 3, or indirectly via a hydraulic drive 61, as explained in more detail in connection with FIG. 4.

The hydraulic switching element 7 is intended in particular to switch off the impact mechanism of the hammer drill 1 while the hammer drill is lowered into the drill hole.

At the same time, however, the drill hole shall be flushed. When the drilling tool 4 touches the bottom of the drill hole 46, the impact mechanism of the hammer drill 1 switches on automatically.

The design of the hydraulic switching element 7 is explained in more detail by means of FIG. 6. As can be seen from FIG. 6, the switching element 7 contains a cylindrical housing 70 with a control piston 75 mounted therein so as to be slidable. The housing 70 has an inlet 703 on its upper side 71. In addition, the housing 70 has at least a first outlet 701 on a side wall 72. Furthermore, the control element 7 has at least one second outlet 702, which is arranged inside the control piston 75.

The control piston 75 can be extended from the housing by means of at least one compression spring 79. If the switching element 7 is not axially loaded, the control piston is extended from the housing 70 by the action of the at least one spring 79. In this position of the control piston, the first outlet 701 is unblocked. A spring valve or a throttle valve 77 can be arranged in the second outlet 702, which valve creates an increased flow resistance at the second outlet 702. As a result, most or all of the flushing fluid is discharged through the first outlet 701 and conducted via the second flushing line 36 to the drilling tool 4.

When the drilling tool 4 is axially loaded via the front side 465 when it is placed on the bottom of the drill hole 46, the hydraulic switching element 7 is also axially loaded. As a result, the control piston 75 is pushed into the housing 70 until it closes the first outlet 701. Then, the flushing fluid supplied via the inlet 703 is discharged exclusively or predominantly through the second outlet and sets the impact mechanism in motion.

Of course, the invention is not limited to the illustrated embodiments. The above description should therefore not be regarded as limiting but as explanatory. The following claims are to be understood as meaning that an indicated feature is present in at least one embodiment of the invention. This does not exclude the presence of further features. Insofar as the claims and the above description define “first” and “second” embodiments, this designation is used to distinguish between two similar embodiments, without establishing an order of priority.

The research work that has led to these results was funded by the European Union.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A hammer drill comprising at least one housing having a cylinder bore, a piston mounted in said cylinder bore such that said piston can move axially between an upper end position and a lower end position, at least one lower fluid supply adapted to cyclically supply the cylinder bore with drive fluid, an upper cover and a lower cover closing the cylinder bore at each end, wherein the piston is in contact with an inner surface of the lower cover in a lower end position, and wherein a ring gap is formed between an outer surface of the piston and an inner wall of the cylinder bore, wherein said ring gap has a gap height H which is greater than $$H=2\cdot(R_{a,cylinder}+R_{a,piston})+3\cdot D_{particles}, \text{ wherein}$$

$R_{a,cylinder}$ and $R_{a,piston}$ denote a mean roughness values of the inner wall of the cylinder bore and the outer surface of the piston, respectively and $D_{particle}$ denotes a maximum particle size in the drive fluid.

2. The hammer drill of claim 1, wherein the lower fluid supply comprises a first channel running through the upper cover and a cylinder wall and the lower cover.

3. The hammer drill of claim 1, further comprising a flushing channel adapted to remove the drive fluid from the cylinder bore.

4. The hammer drill of claim 1, further comprising a drilling tool, wherein an outer surface of the lower cover is in contact with said drilling tool.

5. The hammer drill of claim 1, wherein the ring gap has a gap height between 45 μm and 1500 μm.

6. The hammer drill of claim 1, wherein the piston has a length between 10 cm and 60 cm.

7. The hammer drill of claim 6, wherein, during an operation of the hammer drill, a pressure loss $dP_{gap}$ of the drive fluid in the ring gap is greater than a quotient of a weight force $F_g$ of the piston and a cross-sectional area A of the piston, i.e.

$$dP_{gap} > F_g/A.$$

8. The hammer drill of claim 1, further comprising a hydraulic pump adapted to convey the drive fluid into the cylinder bore or further comprising a hydraulic pump, adapted to deliver the drive fluid into the cylinder bore and adapted to be driven by a flushing fluid.

9. The hammer drill of claim 1, further comprising a switching element having a cylindrical housing and a control piston slidably mounted therein, wherein the cylindrical housing has an inlet on an upper side of the cylindrical housing and a first outlet on a side wall of the cylindrical housing, wherein the control piston is adapted to be extended from the cylindrical housing by means of a compression spring so that the first outlet is unblocked and the control piston is adapted to be retracted inside the cylindrical housing in response to an axial load on the control piston against a force of the compression spring so that the first outlet is closed by the control piston, wherein the cylindrical housing furthermore has a second outlet, which is arranged inside the control piston and any of a spring valve or a throttle valve provided inside said second outlet.

10. The hammer drill of claim 9, further comprising a flushing channel connected to the first outlet of the cylindrical housing of said switching element and the second outlet of the cylindrical housing of said switching element coupled to a hydraulic changeover switch, said hydraulic changeover switch coupled to the upper and the lower fluid supply.

11. The hammer drill of claim 1, further comprising an upper fluid supply, said upper fluid supply comprising a second channel running through the upper cover and adapted to cyclically supply the cylinder bore with drive fluid.

12. A method for deep drilling using a hammer drill with at least one housing having a cylinder bore, the method comprising:

mounting a piston inside said cylinder bore such that said piston can move axially between an upper end position and a lower end position, wherein a ring gap is formed between an outer surface of the piston and an inner wall of the cylinder bore, wherein said ring gap has a gap height H which is greater than $$H=2\cdot(R_{a,cylinder}+R_{a,piston})+3\cdot D_{particle}, \text{ wherein}$$

$R_{a,cylinder}$ and $R_{a,piston}$ denote a mean roughness values of the inner wall of the cylinder bore and the outer surface of the piston, respectively and $D_{particle}$ denotes a maximum particle size in the drive fluid;

closing the cylinder bore with an upper cover and a lower cover at each end;

cyclically supplying a drive fluid to the cylinder bore by at least a lower fluid supply:

letting the piston strike against an inner surface of the lower cover in the lower end position.

13. The method of claim 12, wherein the drive fluid is supplied alternately to both ends of the cylinder bore by said lower fluid supply and an upper fluid supply.

14. The method of claim 13, wherein the drive fluid is supplied to the cylinder bore at a pressure $dP_{gap}$ that is greater than a quotient of a weight force of the piston Fg and a cross-sectional area A of the piston, $$dP_{gap} > F_g/A.$$

15. The method of claim 14, wherein the cylinder bore comprises a flushing channel and the drive fluid is removed from the cylinder bore by means of said flushing channel.

16. The method of claim 14, wherein the drive fluid is delivered by a hydraulic pump which is driven by a flushing fluid.

17. The method of claim 16, wherein the hammer drill further comprises a switching element, wherein the drive fluid is supplied to said switching element, wherein a fluid flow of said drive fluid to the hammer drill is blocked while the hammer drill is lowered into a drill hole and the fluid flow of said drive fluid to the hammer drill is switched on when a bottom of the drill hole is reached.

18. The method of claim 13, wherein an outer surface of the lower cover is in contact with a drilling tool.

* * * * *